(12) United States Patent
Ogino

(10) Patent No.: US 7,043,218 B1
(45) Date of Patent: May 9, 2006

(54) DIVERSITY CDMA RECEPTION APPARATUS HAVING ONLY ONE CDMA RECEIVING PART

(75) Inventor: Tooru Ogino, Tokyo (JP)

(73) Assignee: NEC Corporation, Tokyo (JP)

( * ) Notice: Subject to any disclaimer, the term of this patent is extended or adjusted under 35 U.S.C. 154(b) by 1180 days.

(21) Appl. No.: 09/606,761

(22) Filed: Jun. 29, 2000

(30) Foreign Application Priority Data

Jun. 30, 1999 (JP) .................................. 11-184548

(51) Int. Cl.
*H04B 1/06* (2006.01)
*H04B 17/00* (2006.01)

(52) U.S. Cl. ............................. 455/277.2; 455/226.2; 455/277.1

(58) Field of Classification Search ............. 455/226.1, 455/226.2, 226.4, 269, 272, 277.1, 277.2, 455/280; 375/346, 349; 370/320, 335, 342
See application file for complete search history.

(56) References Cited

U.S. PATENT DOCUMENTS

| 4,620,147 | A  | * | 10/1986 | Niki         | 455/243.1 |
| 6,032,033 | A  | * | 2/2000  | Morris et al.| 455/277.2 |
| 6,243,563 | B1 | * | 6/2001  | Nakamura     | 455/277.1 |
| 6,296,565 | B1 | * | 10/2001 | Kenkel et al.| 455/277.2 |

FOREIGN PATENT DOCUMENTS

| JP | 56-168440   | 12/1981 |
| JP | 5-206903    | 8/1993  |
| JP | 6-268635    | 9/1994  |
| JP | 9-36843     | 2/1997  |
| JP | 9-331282    | 12/1997 |
| JP | 11-55728    | 2/1999  |
| WO | WO 98 52300 | 11/1998 |
| WO | WO 00/67395 | 11/2000 |

* cited by examiner

*Primary Examiner*—Quochien B. Vuong
(74) *Attorney, Agent, or Firm*—Scully, Scott, Murphy & Presser, P.C.

(57) ABSTRACT

In a diversity CDMA reception apparatus comprising two reception antennas, one of reception levels in two reception antennas is gradually increased during a predetermined time interval while another of the reception levels is gradually decreased during the predetermined time interval. During the predetermined time interval, strength of a received electric field is measured and one of the two reception antennas is selected in accordance with a measured result. In this event, the diversity CDMA reception apparatus is provided with two attenuators corresponding to the two reception antennas to make an attenuating amount of one of the two attenuators gradually decrease and to make an attenuating amount of another of the two attenuators gradually increase. In addition, a first accumulated amount of the strength of the received electric field for the first half of the predetermined time interval and a second accumulated amount of the strength of the received electric field for the letter half of the predetermined time interval are measured and one of the two reception antennas is selected in accordance with a comparison result between the first and the second accumulated amounts.

24 Claims, 15 Drawing Sheets

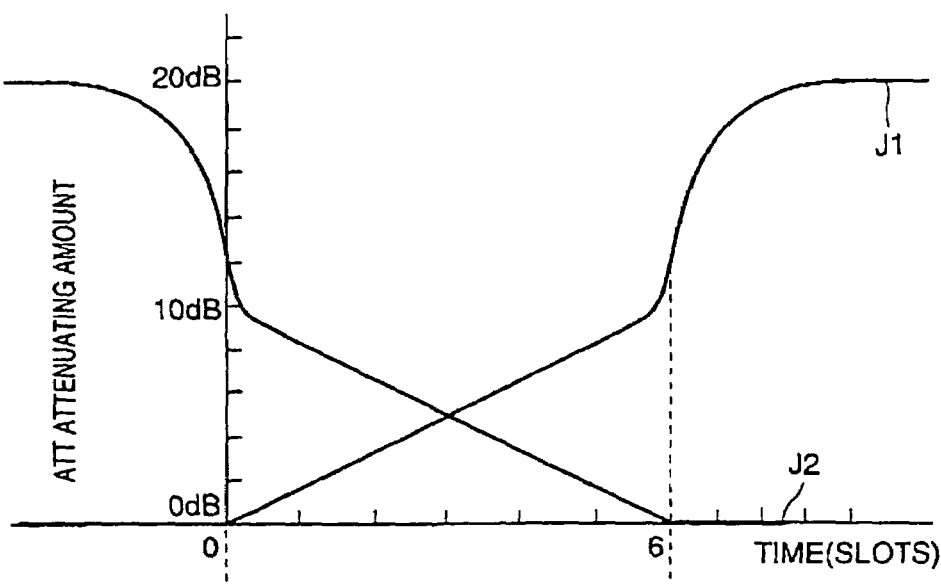
FIG.9A
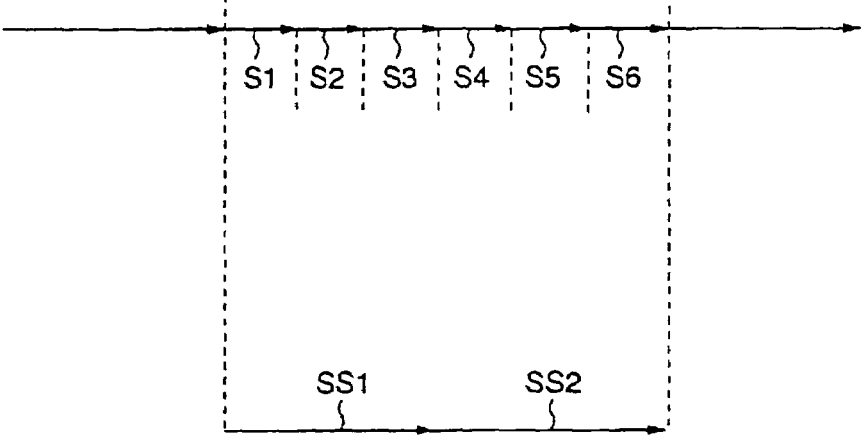
FIG.9B
FIG.9C

FIRST SYMBOL

SIXTIETH SYMBOL

REGISTER 721

SIXTY-FIRST SYMBOL

ONE HUNDRED AND TWENTIETH SYMBOL

REGISTER 722

| TIME INSTANT | VOLTAGE OF POINT A | VOLTAGE OF POINT B | VOLTAGE OF POINT C |
|---|---|---|---|
| 0.00 | 3.00 | 0.00 | 3.00 |
| 0.50 | 2.58 | 0.05 | 2.82 |
| 1.00 | 2.05 | 0.14 | 2.76 |
| 1.50 | 1.54 | 0.28 | 2.85 |
| 2.00 | 1.24 | 0.34 | 2.94 |
| 2.50 | 0.87 | 0.43 | 2.78 |
| 3.00 | 0.50 | 0.50 | 2.94 |
| 3.50 | 0.43 | 0.87 | 2.76 |
| 4.00 | 0.34 | 1.24 | 2.84 |
| 4.50 | 0.28 | 1.54 | 2.86 |
| 5.00 | 0.14 | 2.05 | 2.84 |
| 5.50 | 0.05 | 2.58 | 2.76 |
| 6.00 | 0.00 | 3.00 | 3.00 |

DIVERSITY CDMA RECEPTION APPARATUS HAVING ONLY ONE CDMA RECEIVING PART

BACKGROUND OF THE INVENTION

This invention relates to a digital multiple reception apparatus and a digital multiple receiving method and, in particular, to a reception apparatus and a receiving method for realizing diversity reception in a code division multiple access (CDMA) communication.

In the manner which will later be described in conjunction with FIG. 1, a conventional diversity CDMA reception apparatus for the CDMA communication comprises a first and a second reception parts. Accordingly, the conventional diversity CDMA reception apparatus is disadvantageous in that it has a large mounted area and a lot of consumed current.

In addition, the diversity CDMA reception apparatus is different from a diversity time division multiple access (TDMA) reception apparatus for a TDMA communication. This is because the diversity CDMA reception apparatus carries out continuous reception operation while the diversity TDMA reception apparatus carries out reception operation in a time division fashion or intermittently reception operation. Accordingly, the diversity CDMA reception apparatus cannot adopt a structure or an antenna switching technique which is adopted in the diversity TDMA reception apparatus in the manner which will later be described in conjunction with FIG. 2. That is, if the antenna switching technique in the diversity TDMA reception apparatus is adopted in the diversity CDMA reception apparatus, the diversity CDMA reception cannot receive data at a time when antenna switching is carried out in a moment.

In addition, various prior arts related to the present invention are already known. By way of example, Japanese Unexamined Patent Publication of Tokkai No. Hei 5-206, 903 or JP-A 5-206903 discloses "DIVERSITY DEVICE" to switch receiving antennas when a reception level drops to a level less than a prescribed one during the reception of a reception slot. According to JP-A 5-206903, a receiver selects a desired radio wave, outputs an IF signal and generates a reception field level. Sample and hold circuits hold the reception levels of the respective antennas before the reception slot and a first comparator compares the reception levels. A control circuit generates a branch control signal so that branch having a large level is selected each frame on the basis of the output of the first comparator and a switch timing signal generated immediately before the reception slot. A second comparator compares the reception field level in the reception slot with a reference voltage. When the reception field level in the reception slot becomes less than reference voltage, the reception level drop signal is switched and the control circuit switches the branch control signal based on the switching and switches the receiving antennas.

However, JP-A 5-206903 may disclose a diversity device for use in a TDMA system.

Japanese Unexamined Patent Publication of Tokkai No. Hei 9-331,282 or JP-A 9-331282 discloses "ANTENNA SWITCHING DIVERSITY CIRCUIT" to reduce the variation in the mutual coupling amount between two antennas in a miniaturized antenna diversity circuit. According to JP-A 9-331282, a combination of first through third switching circuits selects, as a selected antenna, one of a reception antenna and a transmission-reception antenna which receives a signal having the higher receiving electric field level and connects the selected antenna to a received signal input terminal of a reception circuit. A nonselected antenna is terminated by a terminator having nearly the same impedance as the input impedance of the received signal input terminal of the reception circuit. Consequently, the mutual coupling amount between the selected antenna and the circuit connected with the selected antenna, and the nonselected antenna and the circuit connected with the nonselected antenna, can always be made almost constant. It is possible to stabilize the maximum gain frequency and maximum gain of the reception antenna.

However, JP-A 9-331282 may disclose an antenna switching diversity circuit for stabilizing the maximum gain frequency and maximum gain of the reception antenna.

Japanese Unexamined Patent Publication of Tokkai No. Hei 6-268,635 or JP-A 6-268635 discloses "RADIO COMMUNICATIONS EQUIPMENT AND ANTENNA DIVERSITY METHOD FOR THE SAME" to provide an antenna diversity method for reducing the cost of the radio communications equipment, miniaturizing it by simplifying the configuration of a reception system, and exactly selecting an antenna system. According to JP-A 6-268635, at the radio communications equipment, a receiver and a demodulator are integrated into one system. Then, the measurement of received electric field strength and the collection of reception errors or the decision is accurately performed under the control of a microcomputer and a software memory inside a control part of the radio communication equipment so as to connect a first satisfactory antenna to the reception part of one system and, based on this result, antenna diversity is performed. Thus, there are advantages such as easily selecting/switching the antenna system used for receiving valid data and further preparing an optimum radio communications system.

JP-A 6-268635 may disclose an antenna diversity method for use in a TDMA/TDD radio communications system.

Japanese Unexamined Patent Publication of Tokkai No. Hei 9-36,843 or JP-A 9-36843 discloses "DIVERSITY RECEPTION CIRCUIT" to hold satisfactory reception quality and to retrieve an idle channel during communication without hit. According to JP-A 9-36843, first and second antennas, first and second reception demodulation parts, first and second synthesizers, a control part and a decoding part are provided. In a regular communication, the same selected frequency signals are outputted from both the first and the second synthesizers. Demodulation output from the reception demodulation part, which is related to a larger received electric field intensity, is given to the decoding part. In the case of retrieving the other idle channel or switching the channel, one synthesizer is caused to output the selected frequency signal of the channel in the middle of communication and the other synthesizer is caused to output the selected frequency signal of the channel of a switching destination.

JP-A 9-36843 may disclose a diversity reception circuit comprising two reception demodulation parts.

Japanese Unexamined Patent Publication of Tokkai No. Hei 11-55,728 or JP-A 11-55728 discloses "MOBILE RADIO SYSTEM" to improve the reliability of communication, the transmission efficiency and low power consumption by avoiding occurrence of intrusion of an interference wave with a simple configuration and to effectively utilize a frequency by using other communication carrier frequency on the occurrence of intrusion of the interference wave. According to JP-A 11-55728, in the system, a mobile terminal has first and second reception systems and a transmission system. The system adopts the after detection selection type space diversity method that selects one demodulation signal based on a level of an RSSI signal corresponding to the reception electric field strength of a received signal. The first and the second reception systems have a configuration of the double superheterodyne method. Furthermore, the communication system adopts the time division multiple access/frequency division duplex TDMA/FDD system, and a base station makes transmission by a TDM. In the case that the mobile terminal detects production of intrusion of an interference wave through one or both of an incoming frequency and an outgoing frequency with respect to the base station, occurrence of intrusion of an interference wave is reported to the base station. After the base station receives an intrusion occurrence notice of the interference wave from the mobile terminal, the base station assigns other time slot or a communication carrier frequency to the mobile terminal.

JP-A 11-55728 may disclose a mobile radio system comprising two reception systems having the configuration of the double superheterodyne method.

SUMMARY OF THE INVENTION

It is an object of this invention to provide a digital multiple reception apparatus which is capable of realizing an optimum antenna diversity reception for adopting a CDMA reception system.

Other objects of this invention will become clear as the description proceeds.

According to an aspect of this invention, a digital multiple receiving apparatus comprises first and second reception antennas, a reception level control arrangement for gradually increasing one of reception levels in the first and the second reception antennas during a predetermined time interval and for gradually decreasing another of the reception levels during the predetermined time interval, a measuring arrangement for measuring strength of a received electric field during the predetermined time interval to produce a measured result, and a selecting arrangement for selecting, in response to said measured result, one of the first and the second reception antennas.

According to another aspect of this invention, a method is for receiving in a digital multiple receiving apparatus comprising first and second reception antennas. The method comprises a reception level control step of gradually increasing one of reception levels in the first and the second reception antennas during a predetermined time interval and of gradually decreasing another of the reception levels during the predetermined time interval, a measuring step of measuring strength of a received electric field during the predetermined time interval to produce a measured result, and a selecting step of selecting, in response to the measured result, one of the first and the second reception antennas.

BRIEF DESCRIPTION OF THE DRAWING

FIGS. 9A through 9C are views for use in describing an example of a switching operation from a first reception antenna to a second reception antenna;

DESCRIPTION OF THE PREFERRED EMBODIMENTS

Figure 1:
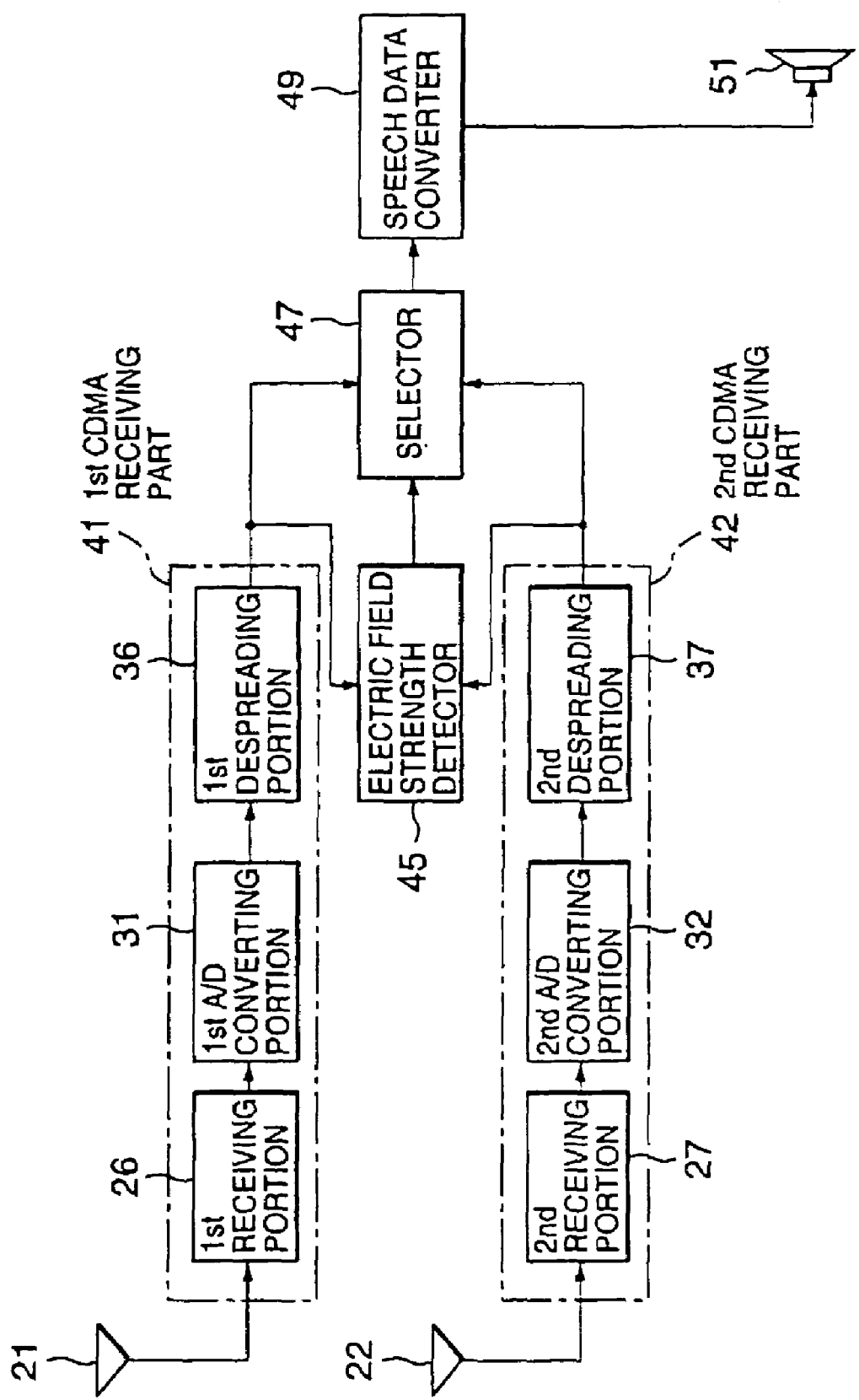
FIG. 1 shows a block diagram of a conventional diversity CDMA reception apparatus.

Referring to FIG. 1, a conventional diversity CDMA reception apparatus will be described at first in order to facilitate an understanding of the present invention.

The illustrated diversity CDMA reception apparatus comprises first and second reception antennas 21 and 22 and first and second receiving portions 26 and 27. Each of the first and the second receiving portions 26 and 27 comprises a high frequency amplifier portion (not shown) for high frequency amplification and frequency conversion and an intermediate frequency (IF) amplifier portion (not shown) for intermediate frequency amplification. At any rate, the first and the second receiving portions 26 and 27 produce first and second received signals in the form of a baseband signal, respectively. The first and the second received signals are supplied to first and second analog-to-digital (A/D) converting portions 31 and 32, respectively. The first A/D converting portion 31 converts the first received signal into a first digital signal while the second A/D converting portion 32 converts the second received signal into a second digital signal. The first and the second digital signals are supplied to first and second despreading portions 36 and 37, respectively. The first despreading portion 36 despreads the first digital signal using a specific spreading code assigned to the CDMA diversity reception apparatus in question to produce a first despread signal. Likewise, the second despreading portion 36 despreads the second digital signal using the specific spreading code to produce a second despread signal.

At any rate, a combination of the first receiving portion 26, the first A/D converting portion 31, and the first despearding portion 36 serves as a first CDMA receiving part 41 for carrying out a first CDMA reception operation. Similarly, a combination of the second receiving portion 27, the second A/D converting portion 32, and the second depreading portion 37 acts as a second CDMA receiving part 42 for carrying out a second CDMA reception operation.

The first and the second despread signals are supplied to an electric field strength detector 45 and a selector 47. The electric field strength detector 45 detects or measures a first reception electric field strength of the first despread signal and a second reception electric field strength of the second despread signal. The electric field strength detector 45 supplies the selector 47 to a selection signal to make the selector 47 select, as a selected signal, one of the first and the second despread signals that has a stronger one of the first and the second reception electric field strength. The selected signal is supplied to a speech data converter 49. The speech data converter 49 converts the selected signal into a speech signal. The speech signal is supplied to a speaker 51. Responsive to the speech signal, the speaker 51 utters speech or a voice (or an audible tone).

As described above, the conventional diversity CDMA reception apparatus comprises the first and the second receiving parts. As a result, the conventional diversity COMA reception apparatus is disadvantageous in that it has a large mounted area and a lot of consumed current, as mentioned in the preamble of the instant specification.

In addition, the diversity COMA reception apparatus is different from a diversity time division multiple access (TDMA) reception apparatus for a TDMA communication. This is because the diversity CDMA reception apparatus carries out continuous reception operation while the diversity TDMA reception apparatus carries out reception operation in a time division fashion or intermittently reception operation. Accordingly, the diversity CDMA reception apparatus cannot adopt structure or an antenna switching technique which is adopted in the diversity TDMA reception apparatus in the manner which will presently be described.

Figure 2:
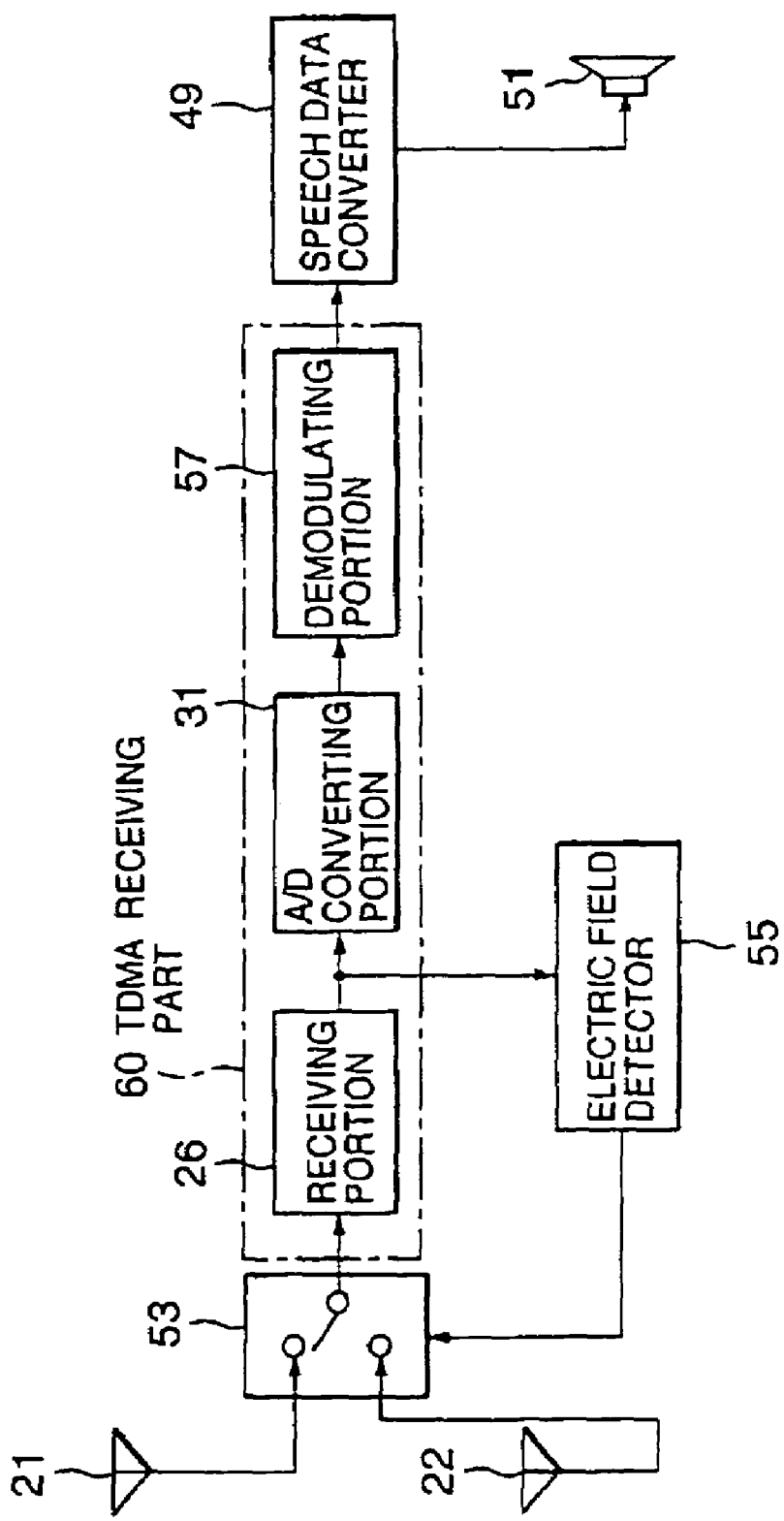
FIG. 2 shows a block diagram of a general diversity TDMA reception apparatus.

Referring to FIG. 2, the description will proceed to the diversity TDMA reception apparatus. The diversity TDMA reception apparatus comprises the first and the second reception antennas 21 and 22 and a switching relay 53 for selecting, as a selected reception antenna, one of the first and the second reception antennas 21 and 22 in the manner which will later become clear. The switching relay 53 is connected to a receiving portion 26. The receiving portion 26 receives a signal from the selected antenna to produce a received signal. The received signal is supplied to an A/D converting portion 31 and an electric field detector 55. The A/D converting portion 31 converts the received signal into a digital signal. The digital signal is supplied to a demodulating portion 57. The demodulating portion 57 demodulates the digital signal into a demodulated signal. At any rate, a combination of the receiving portion, the AID converting portion 31, and the demodulating portion 52 serves as a TDMA receiving part 60 for carrying out a TDMA reception operation. That is, the diversity TDMA reception apparatus comprises only one TDMA receiving part 60.

The demodulated signal is supplied to the speech data converter 49. The speech data converter 49 converts the demodulated signal into the speech signal. The speech signal is supplied to the speaker 51. Responsive to the speech signal, the speaker 51 utters speech or a voice (or an audible tone).

On the other hand, the electric field detector 55 detects an electric field in the received signal. Responsive to the electric field of the received signal, the electric field detector 55 produces a selection signal for selecting one the first and the second reception antennas 21 and 22. The selection signal is supplied to the switching relay 53. Responsive to the selection signal, the switching relay 53 selects one of the first and the second reception antennas as the selected reception antenna.

Figure 3:
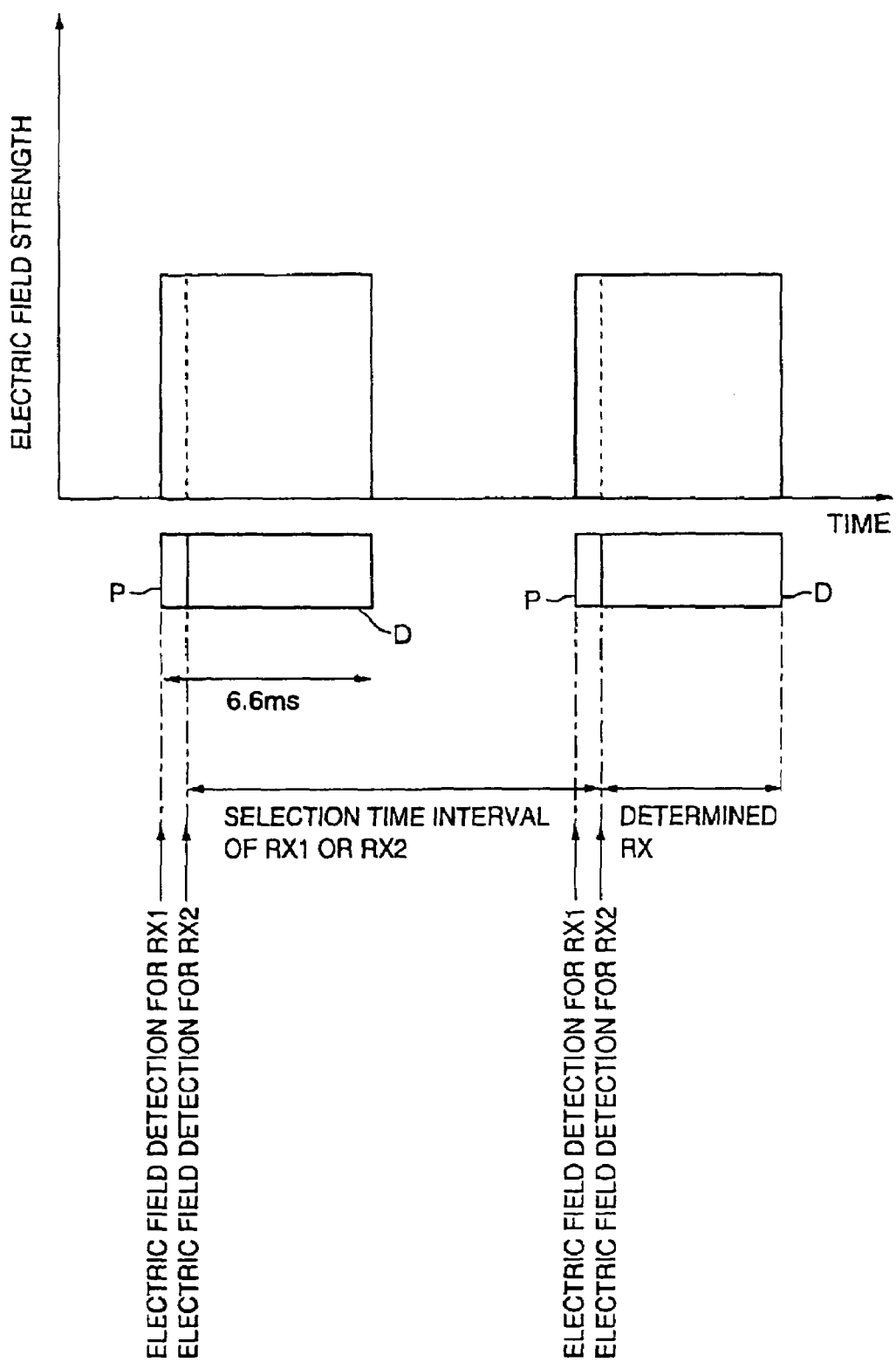
FIG. 3 is a view for use in describing operation of antenna switching in the TDMA receiving apparatus illustrated in FIG. 2.

Turning to FIG. 3, the description will proceed to an antenna switching method in the switching relay 48. In FIG. 3, the abscissa and the ordinate represent time and received electric field strength, respectively. As shown in FIG. 3, the reception electric field appears as a sequence of burst reception waveforms because of a TDMA system. Each burst reception waveform comprises a pilot signal part P and a reception data part D during one time slot. A combination of the first reception antenna 21 and the receiving portion 26 serves as a first receiving unit RX1 while a combination of the second reception antenna 22 and the receiving portion 26 serves as a second receiving unit RX2. The electric field detector 55 detects, during the pilot signal part P of the one slot, a first electric filed in the received signal received by the first receiving unit RX1 and a second electric field in the received signal received by the second receiving unit RX2. The electric field detector 55 determines, as a determined antenna, one of the first and the second reception antennas 21 and 22 in a selection time interval illustrated in FIG. 3 and thereafter makes the receiving portion 26 carry out reception operation using the determined antenna. In addition, in the example being illustrated, the one slot is equal to 6.6 milliseconds.

If the antenna switching technique in the diversity TDMA reception apparatus illustrated in FIG. 2 is adopted in the diversity CDMA reception apparatus, the diversity CDMA reception cannot receive data at a time when antenna switching is carried out in a moment. This is because the diversity CDMA reception apparatus carries out continuous reception operation. In addition, in a case where the antenna switching of the above-mentioned TDMA system is carried out on reception of the pilot signal without received data, a switching speed of the antenna is not in time because the pilot signal has an extremely short time interval as shown in FIG. 3.

Figure 4:
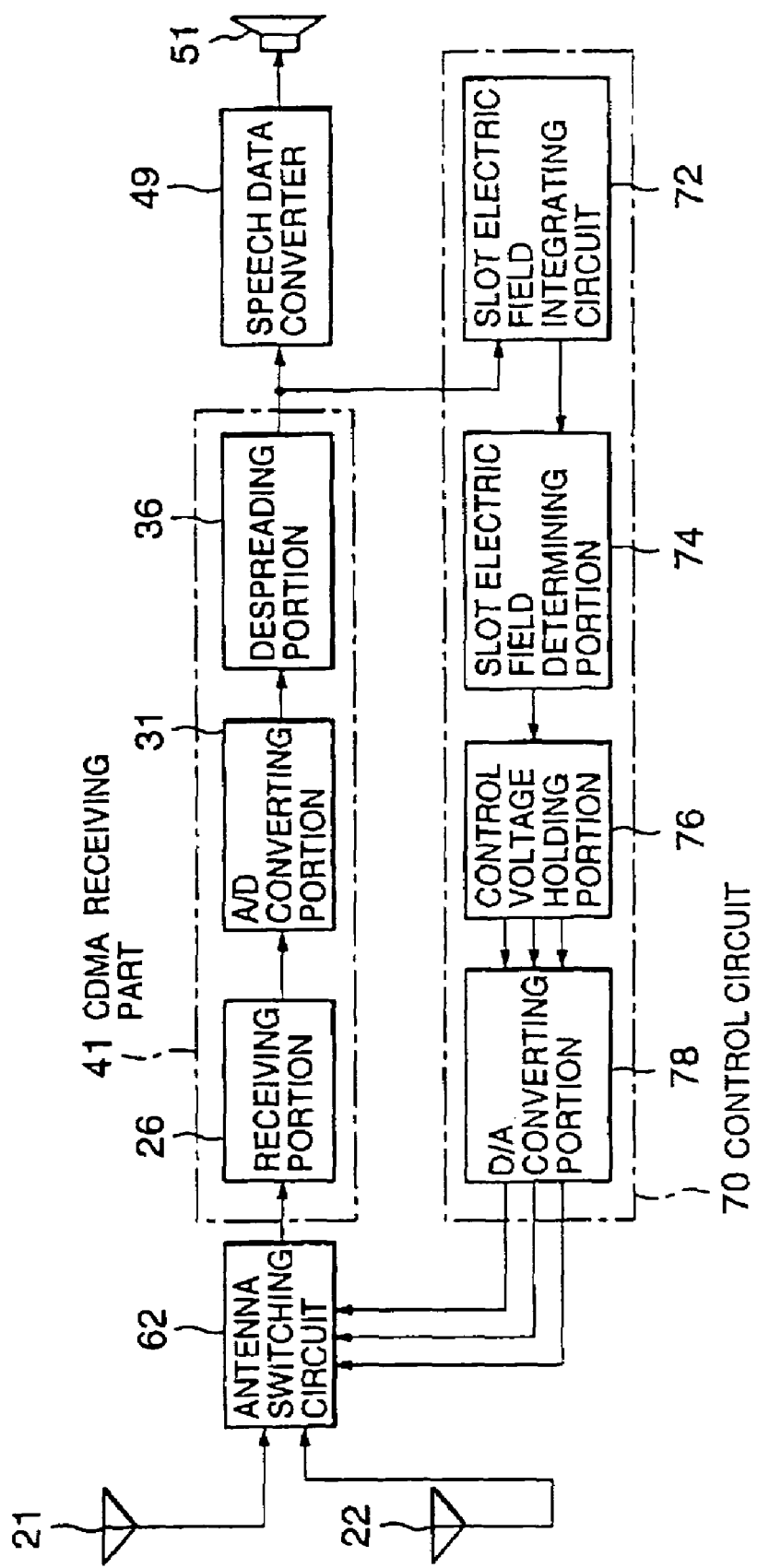
FIG. 4 shows a block diagram of a digital multiple receiving apparatus (CDMA receiving apparatus) according to an embodiment of this invention.

Referring to FIG. 4, the description will proceed to a digital multiple reception apparatus according to a preferred embodiment of this invention. The illustrated digital multiple reception apparatus is a diversity CDMA reception apparatus. The diversity CDMA reception apparatus comprises the first and the second reception antennas 21 and 22 and an antenna switching circuit 62 for switching the first and the second reception antennas 21 and 22 in the manner which will later become clear. A switching control of the antenna switching circuit 62 is carried out by a control circuit 70. The control circuit 70 comprises a slot electric field integrating circuit 72, a slot electric field determining portion 74, a control voltage holding portion 76, and a digital-to-analog (D/A) converting portion 78 which will later be described in detail.

The antenna switching circuit 62 produces a switched output signal which is supplied to the receiving portion 26. In the manner as described above, the receiving portion 26 comprises the high frequency amplifier portion (not shown) for high frequency amplification and frequency conversion and the intermediate frequency (IF) amplifier portion (not shown) for intermediate frequency amplification. At any rate, the receiving potion 26 receives the switched output signal to produce the received signal. The received signal is supplied to the AID converting portion 31. The A/D converting portion 31 converts the received signal into the digital signal. The digital signal is supplied to the despreading portion 36. The despreading portion 36 carries out a despreading processing on the digital signal to produce the despread signal. At any rate, a combination of the receiving portion 26, the A/D converting portion 31, and the despreading portion 36 serves as the CDMA receiving part 41 for carrying out the CDMA reception operation. The despread signal is supplied to the speech data converter 49. The speech data converter 49 converts the despread signal into the speech signal. The speech signal is supplied to the speaker 51. Responsive to the speech signal, the speaker 51 utters the speech or the voice (or the audible tone).

Figure 5:
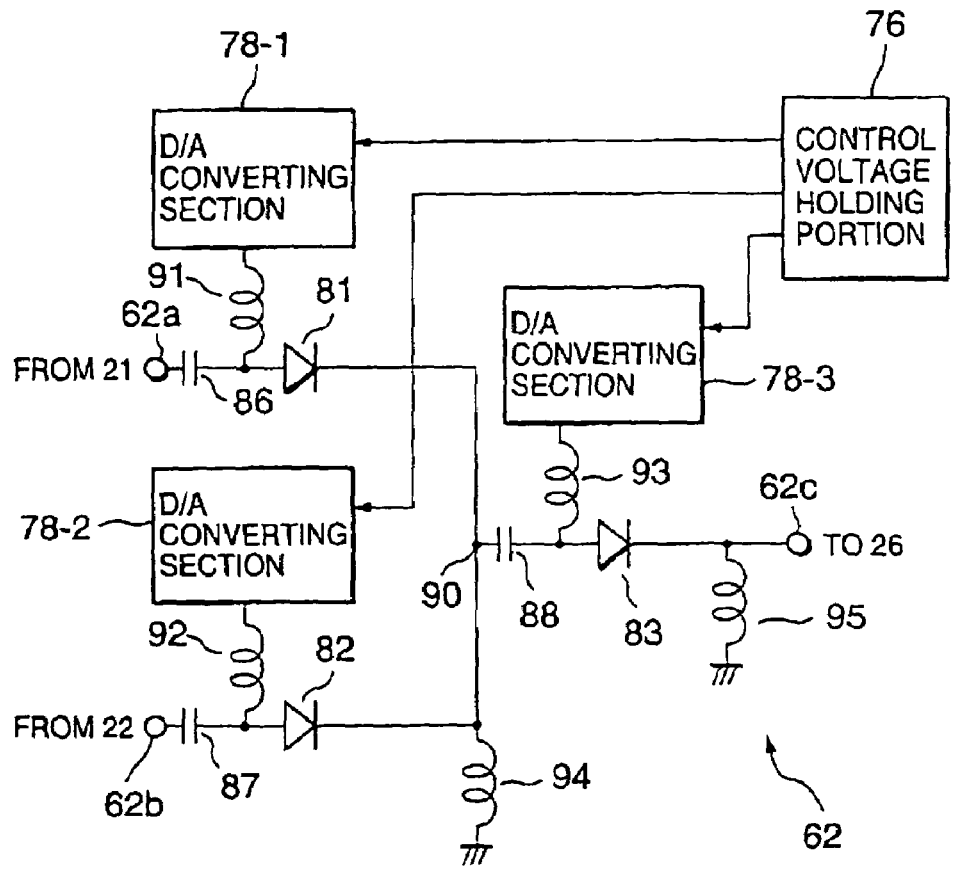
FIG. 5 shows a block diagram of an antenna switching circuit for use in the digital multiple receiving apparatus illustrated in FIG. 4.

Referring to FIG. 5, the description will proceed to the antenna switching circuit 62 illustrated in FIG. 4. The antenna switching circuit 62 has first and second antenna input terminals 62a and 62b which are connected to the first and the second reception antennas 21 and 22, respectively. The antenna switching circuit 62 has an output terminal connected to the receiving portion 26.

Figure 6:
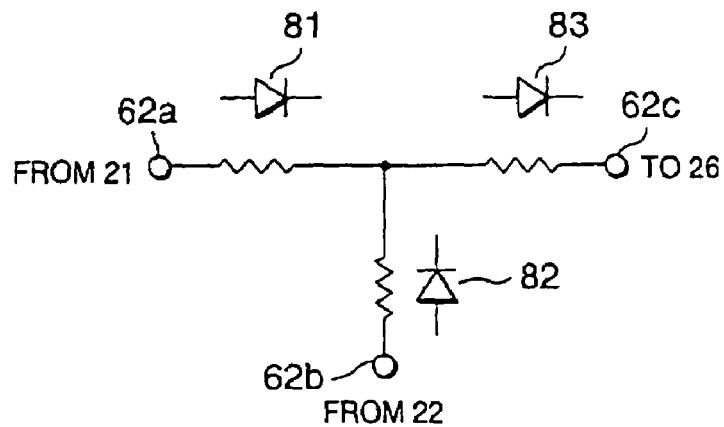
FIG. 6 is a view showing a T-type attenuator composed of three pin diodes.

The antenna switching circuit 62 comprises a T-type attenuator including first through third pin diodes 81, 82, and 83 which are arranged corresponding to the first and the second antenna input terminals 62a and 62b and the output terminal 62c, respectively. That is, the first through the third pin diodes 81 to 83 are connected to a T-type fashion so as to constitute the T-type attenuator as illustrated in FIG. 6. Each pin diode has an anode electrode which is supplied with a control voltage to change a resistance value thereof in a case of seeing in high-frequency. The control voltage is obtained by converting output data of the control voltage holding portion 76 into an analog signal in first through third D/A converting sections 78-1, 78-2, and 78-3 which constitutes the D/A converting portion 78. In addition, each pin diode has a cathode electrode.

Specifically, the D/A converting portion 78 comprises the first through the third D/A converting sections 78-1 to 78-3. The first through the third D/A converting sections 78-1 to 78-3 are supplied with first through third digital signals as the output data from the control voltage holding portion 76. The first D/A converting section 78-1 converts the first digital signal into a first analog signal as a first control voltage. Likewise, the second D/A converting section 78-2 converts the second digital signal into a second analog signal as a second control voltage. The third D/A converting section 78-3 converts the third digital signal into a third analog signal as a third control voltage.

In addition, the antenna switching circuit 62 also comprises first through third capacitors 86, 87, and 88 for cutting a DC component. The first capacitor 86 is connected between the first antenna input terminal 62a and the anode electrode of the first pin diode 81. Similarly, the second capacitor 87 is connected between the second antenna input terminal 62b and the anode electrode of the second pin diode 82. The third capacitor 88 is connected between a connection node 90 and the anode electrode of the third pin diode 83. The connection node 90 is connected to the cathode electrodes of the first and the second pin diodes 81 and 82. The antenna switching circuit 62 further comprises first through fifth high-frequency choke coils 91, 92, 93, 94, and 95 for DC biasing the first through the third pin diodes 81 to 83. The first high-frequency choke coil 91 is inserted between an output terminal of the first D/A converter 78-1 and the anode electrode of the first pin diode 81. Likewise, the second high-frequency choke coil 92 is inserted between an output terminal of the D/A converter 78-2 and the anode electrode of the second pin diode 82. The third high-frequency choke coil 93 is inserted between an output terminal of the D/A converter 78-3 and the anode electrode of the third pin diode 83. The fourth high-frequency choke coil 94 is inserted between the connection node 90 and a ground terminal. The fifth high-frequency choke coil 95 is inserted between the cathode electrode of the third pin diode 95 and the ground terminal.

Description will be made as regards operation of the antenna switching circuit 62 illustrated in FIG. 5. The antenna switching circuit 62 attenuates an input electric field in the first reception antenna 21 and an input electric field in the second reception antenna 22 to produce an attenuated output signal which is supplied to the receiving portion 26. The first pin diode 81 is a pin diode for changing, in accordance with the first control voltage supplied from the first D/A converting section 78-1, a first attenuating amount of the input electric field in the first reception antenna 21. Likewise, the second pin diode 82 is a pin diode for changing, in accordance with the second control voltage supplied from the second D/A converting section 78-2, a second attenuating amount of the input electric field in the second reception antenna 22. The third pin diode 83 is a pin diode for changing, in accordance with the third control voltage supplied from the third D/A converting section 78-3, a third attenuating amount of an electric field supplied to the receiving portion 26.

The antenna switching circuit 62 is characterized by the structure of the T-type attenuator using three elements of the first through the third pin diodes 81 to 83 and of a circuit which is capable of operating so as to hold an impedance of about 50 ohms at each of the first and the second antenna input terminals 62a and 62b and the output terminal 62c of the antenna switching circuit 62 although the attenuating amounts in the input electric fields from the first and the second reception antennas 21 and 22 are changed. The attenuating amounts of the first through the third pin diodes 81 to 83 are controlled by the control voltage holding circuit 76 which stores information related to an optimum attenuating amount and impedance. In addition, it is difficult to make a real circuit having correctly 50 ohms when the real circuit is made and then the real circuit has an impedance value of about 50 ohms. There is no problem in operating the circuit if it is possible to realize the impedance value of about 50 ohms in the real circuit.

Turning back to FIG. 4, the first reception antenna 21 and the second reception antenna 22 are switched by the antenna switching circuit 62. The control of switching the first and the second reception antennas 21 and 22 by the antenna switching circuit 62 is carried out by the control portion 70. Selected by the antenna switching circuit 62, the selected signal is supplied to the receiving portion 26 which mixes a high frequency with a local frequency down to produce a frequency of a baseband signal. The baseband signal is supplied to the A/D converting portion 31 which converts the baseband signal into a digital signal. The digital signal is supplied to the despreading portion 36. The despreading portion 36 carries out a despreading processing on the digital signal to produce a despread signal. The despread signal is supplied to the speech data converter 49. The speech data converter 49 converts the despread signal into a speech signal which is supplied to the speaker 51. Responsive to the speech signal, the speaker 51 utters a speech or a sound.

The illustrated antenna switching circuit 62 is supplied with signals from the first and the second reception antennas 21 and 22 and the antenna switching circuit 62 produces the selected signal which is supplied to the receiving portion 26. The antenna switching circuit 62 is a circuit which attenuates a first input electric field from the first reception antenna 21 and a second input electric field from the second reception antenna 22 to produce the selected signal supplied to the receiving portion 26. In addition, the first and the second attenuating amounts for the first and the second input electric fields are independently changed and controlled by an external control circuit such as a central processing unit (CPU) or the like.

Figure 7:
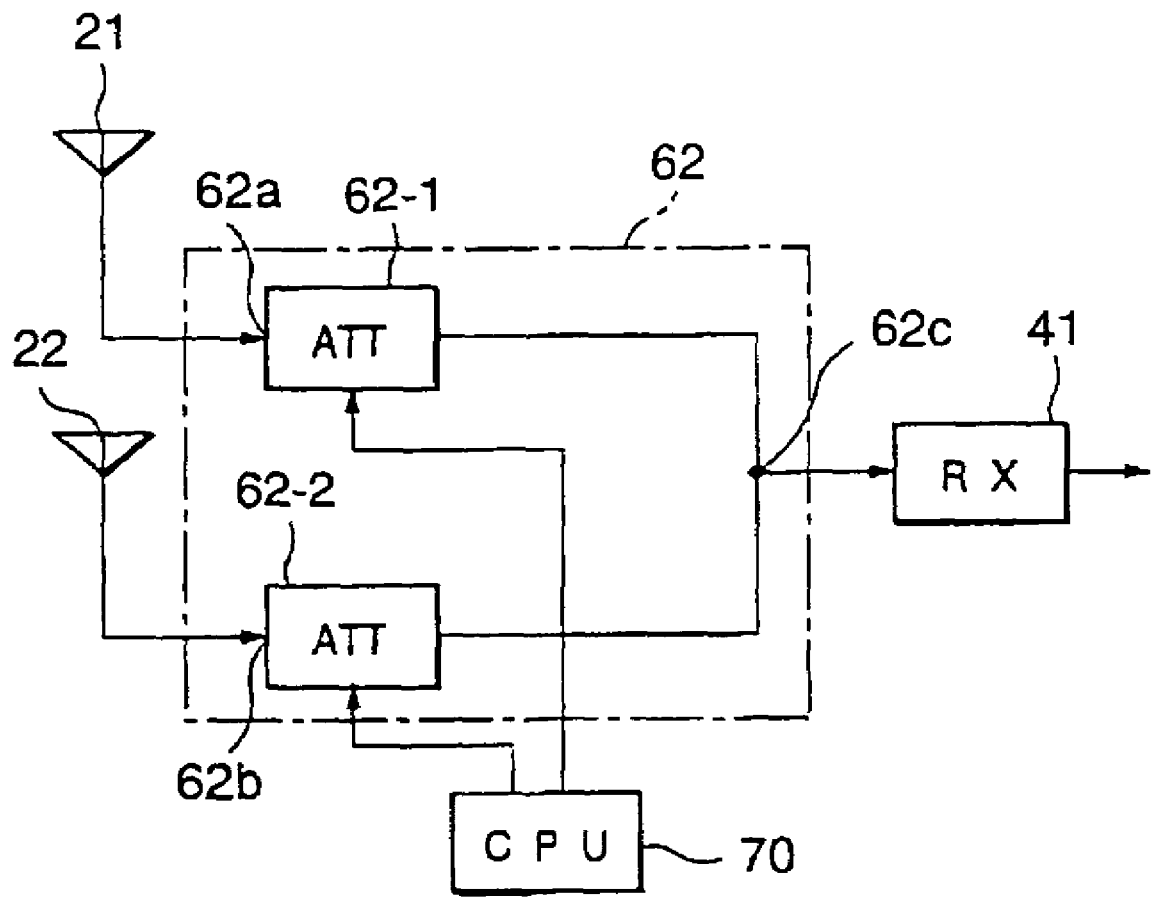
FIG. 7 is a view showing an equivalent circuit of the CDMA receiving apparatus illustrated in FIG. 4.

Specifically, the receiving apparatus illustrated in FIG. 4 is equivalent to a circuit illustrated in FIG. 7. That is, the antenna switching circuit 62 is equivalent to a combination of a first attenuator (ATT) 62-1 and a second attenuator (ATT) 62-2 while the control circuit 70 is equivalent to the central processing unit (CPU). The first reception antenna 21 produces a first received signal which is supplied to the first attenuator 62-1 while the second reception antenna 22 produces a second received signal which is supplied to the second attenuator 62-2. The first attenuator 62-1 attenuates the first received signal to produce a first attenuated signal while the second attenuator 62-2 attenuates the second received signal to produce a second attenuated signal. The first and the second attenuated signals are combined into a combined signal which is supplied to the CDMA receiving part (RX) 41. The first and the second attenuators 62-1 and 62-2 have first and second attenuating amounts, respectively, which are changed and controlled by the central processing unit 70. Control of the first and the second attenuating amounts will later be described.

Referring now to FIG. 5 again, the description will proceed to the antenna switching circuit 62. The first pin diode 81 is a pin diode for changing, in response to the first control voltage supplied from the first D/A converting section 78-1, the first attenuating amount for attenuating the first input electric field supplied from the first reception antenna 21. Likewise, the second pin diode 82 is a pin diode for changing, in response to the second control voltage supplied from the second D/A converting section 78-2, the second attenuating amount for attenuating the second input electric field supplied from the second reception antenna 22. In addition, the first through the third capacitors 86, 87, and 88 are capacitors for DC cutting. The first through the third high-frequency choke coils 91, 92, and 93 are choke coils for DC biasing the first through the third pin diodes 81 to 83, respectively.

Figure 8A:
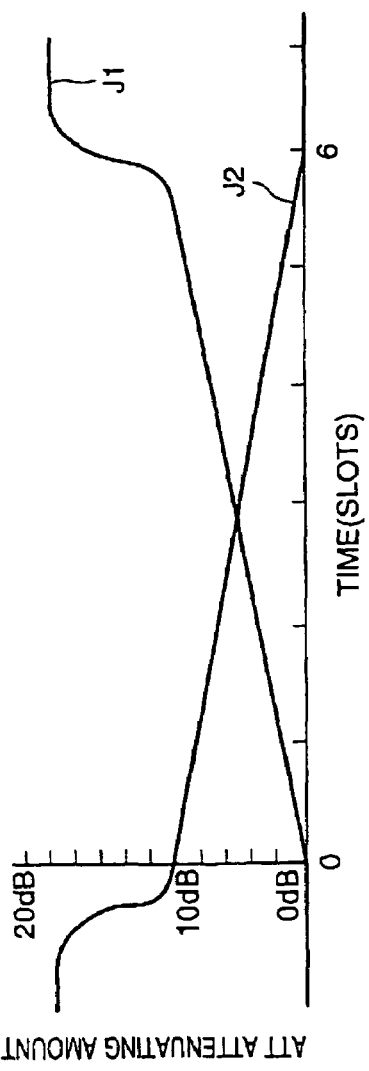
FIGS. 8A through 8C are views for use in describing an example of an antenna switching operation in the CDMA receiving apparatus illustrated in FIG. 4.
Figure 8B:
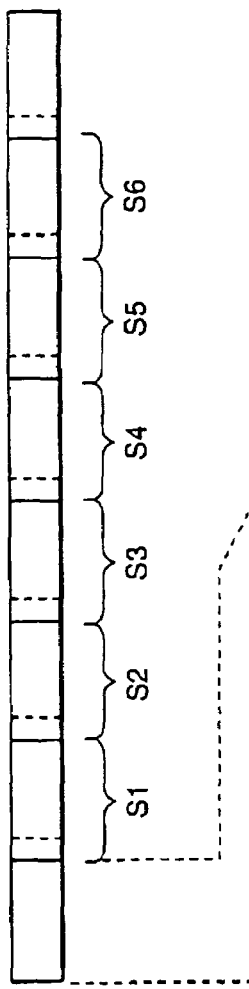
Figure 8C:
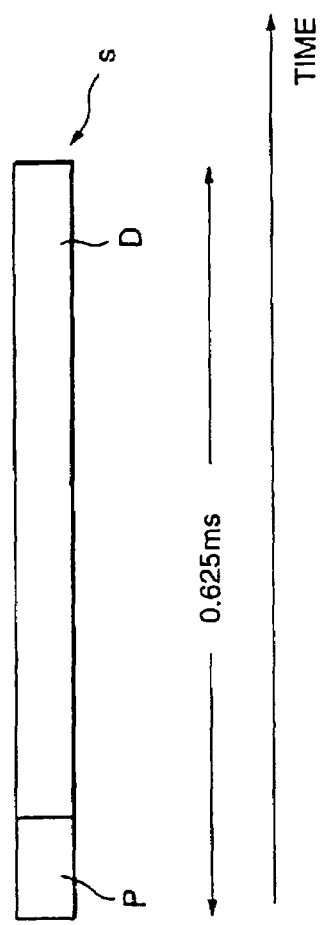

Referring now to FIGS. 8A through 8C, the description will proceed to operation of the receiving apparatus illustrated in FIG. 4. In FIG. 8A, the abscissa and the ordinate represent time (slots) and an ATT attenuating amount (dB), respectively. In FIG. 8A, a reference symbol of J1 represents the first attenuating amount for the first reception antenna 21 while a reference symbol of J2 represents the second attenuating amount for the second reception antenna 22. In a case of CDMA communications, received data from a base station (not shown) is different from burst received data in TDMA communications and also is continuous received data. Accordingly, on carrying out antenna switching diversity for realizing diversity reception without having two receiving circuits, noises occur within a time interval for switching the first and the second reception antennas in the case of the CDMA communications and errors occur in the received data.

Accordingly, the receiving apparatus sets the first and the second attenuating amounts, which are different from each other, for the first and the second input electric fields in the first and the second reception antennas 21 and 22 within a predetermined time interval. In addition, the receiving apparatus determines whether the first input electric field in the first reception antenna 21 is strong or the second input electric field in the second reception antenna 22 is strong. In the example being illustrated, the first and the second attenuating amounts are changed as follows. That is, the first attenuating amount J1 for the first reception antenna 21 is changed from 0 dB to 10 dB during a time interval of six time slots while the second attenuating amount J2 for the second reception antenna 22 is changed from 10 dB to 0 dB during the time interval of the six time slots. In this event, the first and the second attenuating amounts J1 and J2 are gradually changed analogously. It is really impossible to make each attenuating amount to the exact 0 dB that the attenuating amount is restricted to about 0.5 dB. In the meanwhile, representation of "0 dB" means actually about 0.5 dB in the present specification. As shown in FIG. 8B, the six time slots comprises first through sixth time slots S1, S2, S3, S4, S5, and S6. In addition, one time slot S has a length or time interval of 0.625 milliseconds as shown in FIG. 8C. Each time slot S comprises a pilot signal P at a header portion and data D following to the pilot signal P as illustrated in Fig. BC.

FIG. 8A shows the first attenuating amount J1 for the first reception antenna 21 and the second attenuating amount J2 for the second reception antenna 22. As shown in FIG. 8A, during the time interval corresponding to the six time slots from the first time slot S1 to the sixth time slot S6, the slot electric field integrating circuit 72 accumulates received electric field for each of the first through the sixth time slots S1 to S6. In addition, the slot electric field integrating circuit 72 produces an accumulated value of the received electric field which is supplied to the slot electric field determining portion 74.

The slot electric field determining portion 74 compares a first accumulated value of the received electric field during the first half of the first through the third time slots S1 to S3 with a second accumulated value of the received electric field during the letter half of the fourth through the sixth time slots S4 to S6. That is, the slot electric field determining portion 74 determines a first total value of a first electric field integrated value during the first through the third time slots S1 to S3 and a second total value of a second electric field integrated value during the fourth through the sixth time slots S4 to S6. As a result, the slot electric field determining portion 74 can determine whether the first input electric field from the first reception antenna 21 is strong or the second input electric field from the second reception antenna 22 is strong. The slot electric field determining portion 74 produces a determined result which is supplied to the control voltage holding portion 76. Accordingly, the antenna switching circuit 62 switches the first reception antenna 21 and the second reception antenna 22.

In the example being illustrated, the attenuator has the attenuating amount between 0 dB and 20 dB that is equal to about half of variation width of a reception level.

Referring to FIGS. 9A through 9C and FIGS. 10A through 10C, the description will proceed to operation on switching of the first reception antenna 21 and the second reception antenna 22 in more detail.

FIGS. 9A through 9C show an operation on switching from the first reception antenna 21 to the second reception antenna 22. The CDMA reception apparatus carries out reception operation using the first reception antenna 21. In this event, the second attenuating amount for the second reception antenna 22 is equal of the maximum of 20 dB. Under the circumstances, the second attenuating amount for the second reception antenna 22 is gradually decreased while the first attenuating amount for the first reception antenna 21 is gradually increased as shown in FIG. 9A. In this event, the slot electric field determining portion 74 compares a first accumulated value SS1 of the received electric field during the first half of three time slots S1 to S3 with a second accumulated value SS2 of the received electric field during the latter half of three time slots S4 to S6 to determine large or small magnitudes of the first and the second accumulated values SS1 and SS2 as shown in FIGS. 9B and 9C. With this structure, it is possible to judge which reception antenna has a large electric field value.

In the example being illustrated, the second accumulated value SS2 of the received electric field is larger than the first accumulated value SS1 of the received electric field. As a result, the antenna switching circuit 62 selects the second reception antenna 22. Accordingly, after the six time slot S6, the first attenuating amount J1 for the first reception antenna 21 is equal to 20 dB while the second attenuating amount J2 for the second reception antenna 22 is equal to 0 dB.

Figure 10A:
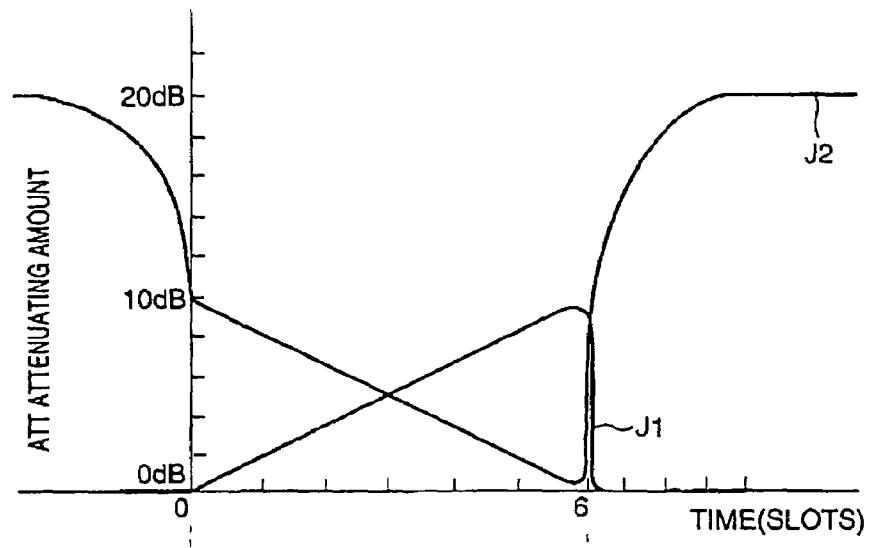
FIGS. 10A through 10C are view for use in describing another example of the switching operation in the first and the second reception antennas.
Figure 10B:
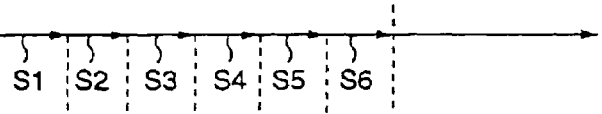
Figure 10C:
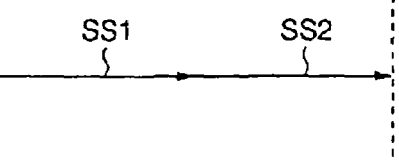

FIGS. 10A through 10C show a state where the receiving apparatus carries out reception operation using the first reception antenna 21 and the second attenuating amount for the second reception antenna 22 is equal to a maximum of 20 dB. As shown in FIG. 10A, the second attenuating amount J2 of the second input electric field for the second reception antenna 22 is gradually decreased while the first attenuating amount J1 of the first input electric field for the first reception antenna 21 is gradually increased. The slot electric field determining portion 74 compares the first accumulated value SS1 of the received electric field during the first half of three time slots S1 to S3 with the second accumulated value SS2 of the received electric field during the latter half of three time slots S4 to S6. In the example being illustrated, inasmuch as the first accumulated value SS1 of the received electric field is larger than the second accumulated value SS2 of the received electric field, the antenna switching circuit 62 selects the first reception antenna 21. Accordingly, after the six time slot S6, the second attenuating amount J2 for the second reception antenna 22 is equal to 20 dB while the first attenuating amount J1 for the first reception antenna 21 is equal to 0 dB.

In the operation described above, it is possible to select one of the first and the second reception antennas 21 and 22 that has a larger strength of the electric field. In addition, antennas having different directivity are generally used as the first and the second reception antennas 21 and 22. For example, a rod-type antenna is used as the first reception antenna 21 while a plate-type antenna is used as the second reception antenna 22.

Figure 11:
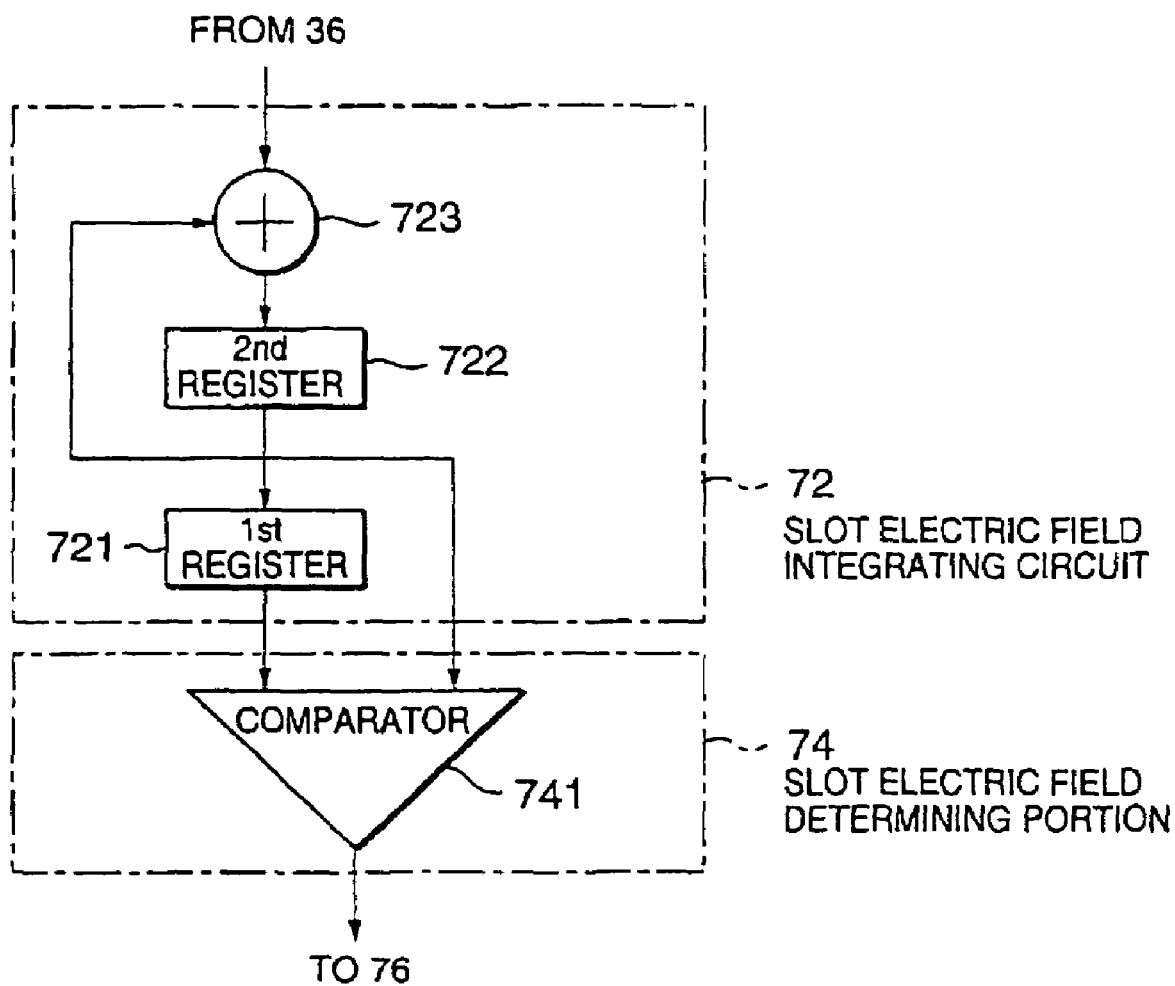
FIG. 11 shows a block diagram of a slot electric field integrating circuit and a slot electric field determining portion for use in the digital multiple receiving apparatus illustrated in FIG. 4.

Referring to FIG. 11, the description will proceed to the slot electric field integrating circuit 72 and the slot electric field determining portion 74. As described above, the slot electric field integrating circuit 72 and the slot electric field determining portion 74 have a function for accumulating first and second input fields during the first half and the latter half of the predetermined time interval and for judging large or small magnitudes of the accumulated values. In order to realizing this function, the slot electric field integrating circuit 72 comprises first and second registers 721 and 722 and an adder 723 while the slot electric field determining portion 74 comprises a comparator 741.

The adder 723 has an input terminal supplied with input data from the despeading portion 36. The adder 723 has another input terminal connected to an output terminal of the second register 722. The adder 723 has an output terminal connected to an input terminal of the second register 722.

The adder 723 adds the input data to held data held in the second register 722. The adder 723 produces added data which is supplied to the second register 722. The output terminal of the second register 722 is connected to an input terminal of the first register 721. The comparator 741 has a first input terminal connected to an output terminal of the first register 721 and a second input terminal connected to the output terminal of the second register 722. The comparator 741 has an output terminal connected to the control voltage holding portion 76.

With this structure, input electric field data for the first half of three time slots are accumulated by a combination of the second register 722 and the adder 723. The combination of the second register 722 and the adder 723 produces a first accumulated value which is held in the first register 721. Subsequently, input electric field data for the latter half of three time slots are accumulated by the combination of the second register 722 and the adder 723. When this accumulation comes to end, the first register 721 holds the first accumulated value for the first half of three time slots while the second register 722 holds a second accumulated value for the latter half of three time slots. Thereafter, the comparator 741 compares the first accumulated value held in the first register 721 with the second accumulated value held in the second register 722.

Figure 12A:
FIGS. 12A through 12D are views for use in describing operation of the slot electric field integrating circuit illustrated in FIG. 11.
Figure 12B:
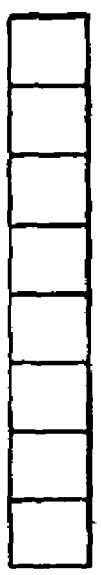
Figure 12B:
Figure 12C:
Figure 12D:
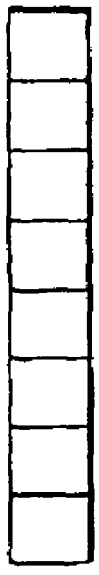
Figure 12D:
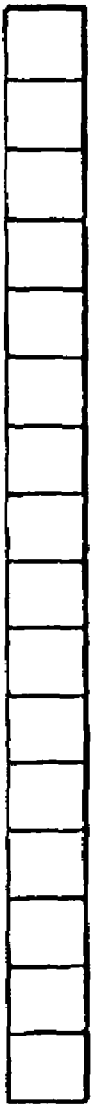

Turning to FIGS. 12A through 12D, it will be assumed that one time slot comprises twenty symbols. In addition, it will be assumed that each symbol consists of eight bits. Under the circumstances, sixty input electric field data from a first symbol to a sixtieth symbol corresponding to the first half of three time slots are accumulated as shown in FIG. 12A and the first accumulated value is held in the first register 721 as shown in FIG. 12B. In addition, sixty input electric field data from a sixty-first symbol to a one hundred and twentieth symbol corresponding to the latter half of three time slots are accumulated as shown in FIG. 12C and the second accumulated value is held in the second register 722 as shown in FIG. 12D.

When the accumulation comes to end, the first register 721 holds the first accumulated value (which comprises, for example, sixteen bits) for the first half of three time slots while the second register 722 holds the second accumulated value (which comprises, for example, sixteen bits) for the latter half of three time slots. In addition, the comparator 741 compares the first accumulated value held in the first register 721 with the second accumulated value held in the second register 722 bit by bit.

In addition, the comparator 741 produces a comparison result which is supplied to the control voltage holding portion 76. Responsive to the comparison result, the control voltage holding portion 76 produces control data corresponding to the comparison result that is supplied to the D/A converting portion 78. The D/A converting portion 78 converts the control data into the first through the third control voltages for controlling the antenna switching circuit 62.

In the above-mentioned manner, accumulation of strength of the electric field and large and small determination are carried out by the slot electric field integrating circuit 72 and the slot electric field determining portion 74 which are newly provided to the receiving apparatus. Such accumulation of strength of the electric field and such large and small determination may be carried out by using output of a power composition portion which is originally provided in the CDMA receiving apparatus.

Figure 13:
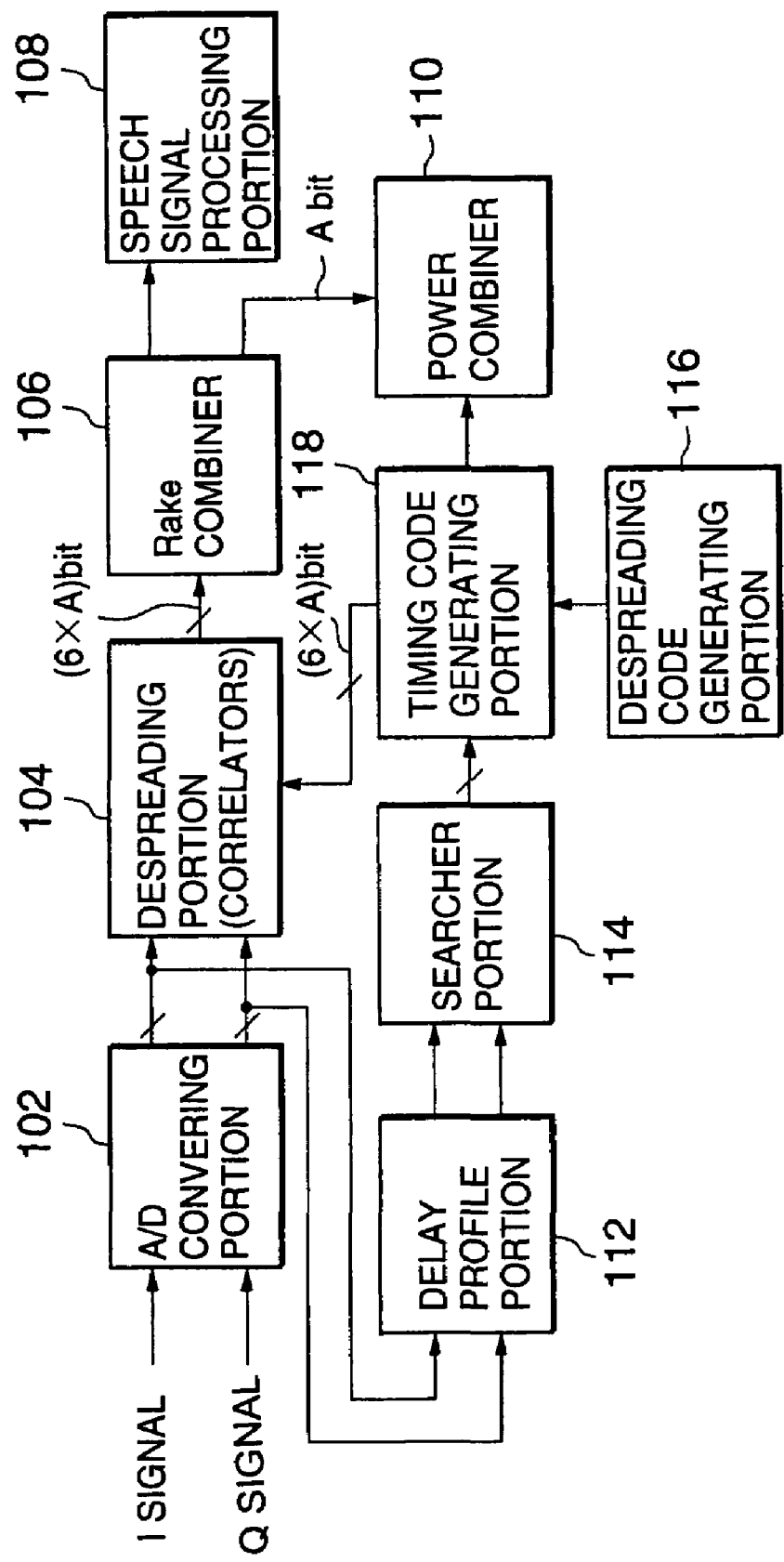
FIG. 13 shows a block diagram of a main part of a general CDMA receiving apparatus.

Referring to FIG. 13, the description will proceed to the CDMA receiving apparatus. The CDMA receiving apparatus comprises an A/D converting portion 102, a despreading portion (correlation calculator) 104, a rake combiner 106, a speech signal processing portion 108, a power combiner 110, a delay profile portion 112, a searcher portion 114, a despreading code generating portion 116, and a timing code generating portion 118.

As shown in FIG. 13, a received signal in the CDMA receiving apparatus comprises an in-phase (I) analog signal and a quadrature (Q) analog signal which are orthogonal to each other. The I analog signal and the Q analog signal are supplied to the A/D converting portion 102. The A/D converting portion 102 converts the I analog signal and the Q analog signal into an I digital signal and a Q digital signal. In the example being illustrated, each of the I digital signal and the Q digital signal has eight bits long. The I digital signal and the Q digital signal are supplied to the despreading portion 104. The despreading portion 104 comprises a plurality of correlators (not shown). In the manner known in the art, the despreading portion 104 carries out a despreading processing on the I digital signal and the Q digital signal. The despreading portion 104 is supplied with a despreading code from the despreading code generating portion 116 through the timing code generating portion 118. In the example being illustrated, the despreading code consists of a signal of (6×A) bits, where A represents a positive integer which is not less than two. The despreading portion 104 produces a despread signal having (6×A) bits long. The despread signal is supplied to the rake combiner 106, The rake combiner 106 combines the despread signal into a combined signal which is supplied to the speech signal processing portion 108. Responsive to the despread signal, the speech signal processing portion 108 produce or utters a speech.

In addition, converted by the A/D converting portion 102, the I digital signal and the Q digital signal are supplied to the delay profile portion 112. The delay profile portion 112 produces correlated value data between the I and the Q digital signals and a spreading code. The correlated value data is supplied to the searcher portion 114. The searcher 114 searches the correlated value data to detect a peak value. The peak value is supplied to the timing code generating portion 118. Responsive to the peak value, the timing code generating portion 118 generates a timing code indicative of a start timing for each time slot.

With this structure, the power combiner 110 is supplied from the rake combiner 106 with data which indicates a strength of a received electric field and which has A bits long. Inasmuch as the power combiner 110 accumulates the strength of the electric field, it is unnecessary to newly provide with the slot electric field integrating circuit 72 and the slot electric field determining portion 74 in the CDMA reception apparatus.

Figure 14:
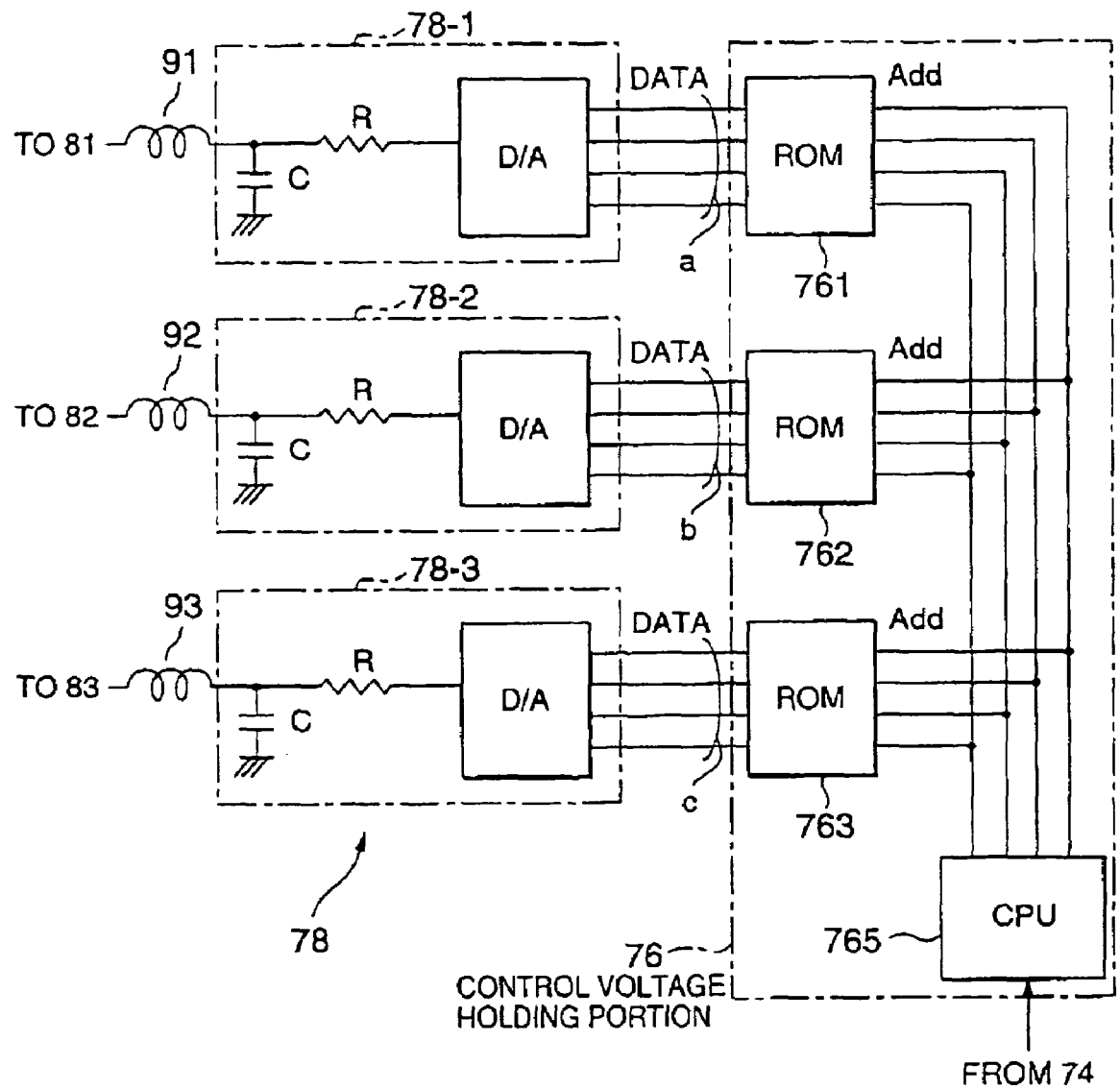
FIG. 14 shows a block diagram of a control voltage holding portion and a D/A converting portion for use in the digital multiple receiving apparatus illustrated in FIG. 4.

Referring to FIG. 14, the description will proceed to the control voltage holding portion 76 and the D/A converting portion 78. As shown in FIG. 14, the D/A converting portion 78 comprises the first through the third D/A converting sections 78-1, 78-2, and 78-3 as described above. Each of the first through the third D/A converting sections 78-1 to 78-3 comprises a D/A converter and a time constant circuit which consists of a resistor R and a capacitor C. In addition, the first through the third D/A converting sections 78-1 to 78-3 produce the first through the third control voltages which are supplied to the first through the third pin diodes 81 to 83 (FIG. 5) through the first through the third high-frequency choke coils 91 to 93, respectively. In addition, the time constant circuit consisting of the resistor R and the capacitor C is for gently changing the control voltage supplied to the pin diode.

In addition, as shown in FIG. 14, the control voltage holding portion 76 comprises first through third read only memories (ROMs) 761, 762, and 763 corresponding to the first through the third D/A converting sections 78-1 to 78-3 and a central processing unit (CPU) 765 for supplying the first through the third ROMs 761 to 763 with first through third addresses, respectively. The first through the third ROMs 761 to 763 preliminarily store first through third data which are supplied to the first through the third D/A converting sections 78-1 to 78-3, respectively. Each of the first through the third data has a value which is determined so as to gradually increase or decrease the attenuating amount in the manner which is described above. In addition, the data value is determined in consideration of a special quality of the corresponding pin diode. As a result, it is possible to gradually change the attenuating amount with a desired characteristic impedance (of 50 ohms in this example) although each pin diode has variations in characteristic.

Figures 15, 16:
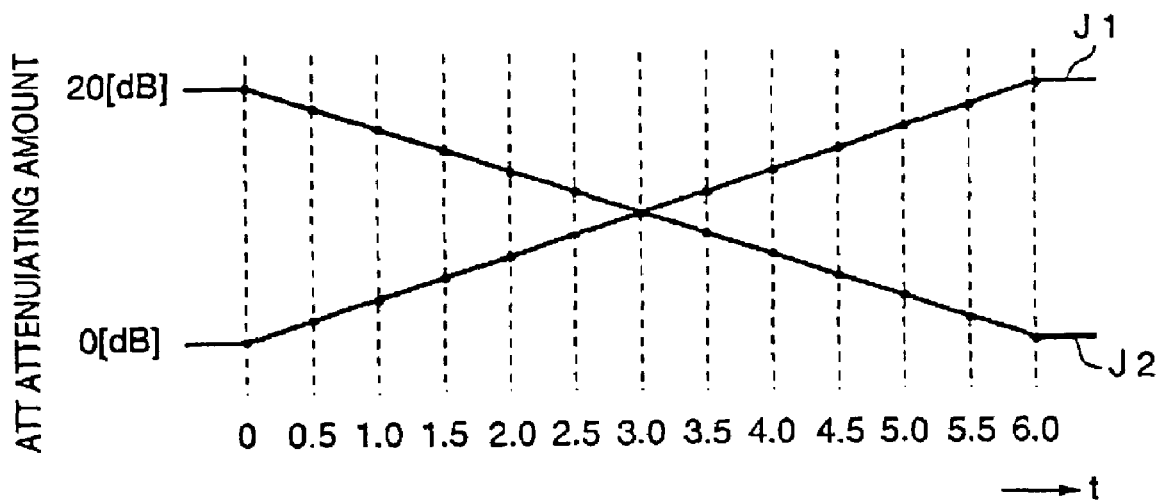
FIG. 15 is a view showing a control example of variation in attenuating amounts.
FIG. 16 is a view showing an example of data stored in each ROM illustrated in FIG. 14.

Turning to FIG. 15, it will be assumed that the attenuating amount is controlled at a period which is twice the time slot for six time slots as shown in FIG. 15. In this event, the first attenuating amount J1 for the first reception antenna 21 is gradually changed from 20 dB to 0 dB which the second attenuating amount J2 for the second reception antenna 22 is gradually changed from 0 dB to 20 dB. Under the circumstances, the first through the third ROMs 761 to 763 store the first through the third data illustrated in FIG. 16. In FIG. 16, the first through the third control voltages at first through third output points a, b, and c of the first through the third ROMs 761 to 763 are illustrated in each time instant from a time instant 0:00 to a time instant 6:00. That is, data shown in FIG. 16 are preliminarily stored the first through the third ROMs 761 to 763 and the first through the third attenuating amounts are controlled by designating the first through the third addressed by the CPU 765 as illustrated in FIG. 15.

In FIG. 14, when the CPU 765 is supplied with the comparison result from the comparator 741 of the slot electric field determining portion 74, the CPU 765 supplies the first through the third addresses to the first through the third ROMs 761 to 763 so that the antenna switching circuit 62 selects one of the first and the second reception antennas 21 and 22 that is determined by the comparison result.

The above-mentioned receiving apparatus realizes a digital multiple receiving method which will presently be described. Specifically, the digital multiple receiving method comprises the steps of gradually changing the first and the second attenuating amounts of the first and the second attenuators corresponding to the first and the second reception antennas, of accumulating a strength of an input electric field, and of selecting one of the first and the second reception antennas on the basis of an accumulated result.

Figure 17:
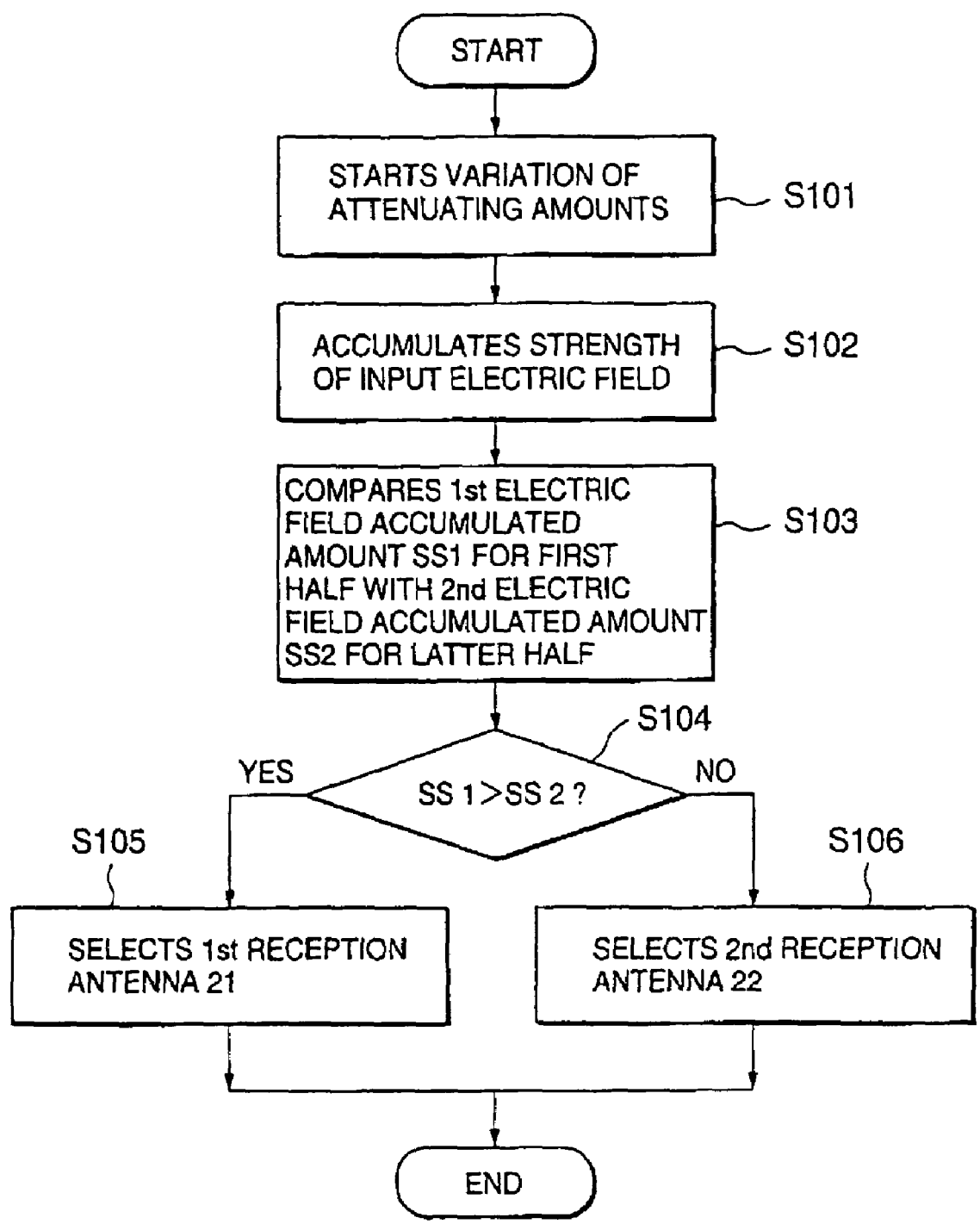
FIG. 17 shows a flow chart for use in describing a receiving method in the digital multiple receiving apparatus illustrated in FIG. 4.

Referring to FIG. 17, the description will proceed to the digital multiple receiving method. At first, a variation of the attenuating amounts is started at a step S101. In this event, one of received levels in the first and the second reception antennas 21 and 22 is gradually increased during a predetermined time interval which another of the received levels in the first and the second reception antennas 21 and 22 is gradually decreased during the predetermined time interval. The step S101 is followed by a step S102 at which strength of an input electric field is accumulated while the attenuating amounts are changed.

When accumulation during the predetermined time interval comes to an end, the step S102 proceeds to a step S103 at which the first electric field accumulated amount SS1 for the first half is compared with the second electric field accumulated amount SS2 for the latter half. When a comparison result indicates that the first electric field accumulated amount. SS1 for the first half is larger than the second electric field accumulated amount SS2 for the latter half (YES in a step S104), the step S104 is succeeded by a step S105 at which the first reception antenna 21 is selected. On the other hand, when the comparison result indicates that the second electric field accumulated amount SS2 for the latter half is larger than the first electric field accumulated amount SS1 for the first half (NO in the step S104), the step S104 is followed by a step S106 at which the second reception antenna 22 is selected.

If measurement of the strength of the received electric field is frequently carried out, it results in shortening the life of battery serving as a power supply of the receiving apparatus. Accordingly, it is necessary to carry out the measurement at a suitable frequency. As a method of changing the frequency of the measurement, variable variations are taken into consideration as follows.

It will be presumed that a current comparison result between current measured results is identical with a previous comparison result between previous measured results. In this event, an interval of the measurement is made longer to decrease the frequency of the measurement. For example, it will be assumed that a state where the strength of the received electric field in the first reception antenna 21 is large is continued. Under the circumstances, inasmuch as the strength of the received electric field in the first reception antenna may be large, the frequency of the measurement is decreased.

In addition, it will be assumed that the receiving apparatus is put into a receiving wait state or the receiving apparatus is located outside the circuit of range where an electric wave to be received reaches. In this event, the frequency of the measurement may be decreased. It will be presumed that the battery serving at the power supply of the receiving apparatus has a remaining amount which is not less than a predetermined value. Under the circumstance, the frequency of the measurement may be decreased.

Furthermore, the frequency of the measurement may be increased or decreased in accordance with the value of the strength of the received electric field. For example, when the strength of the received electric field is small, it is desirable to select the reception antenna having a larger strength of the received electric field. Accordingly, the frequency of the measurement is increased. Conversely, it will be assumed that the strength of the received electric field is large. In this event, the frequency of the measurement is decreased. This is because the strength of the received electric field is large although which reception antenna is selected.

The frequency of the measurement may be increased or decreased in accordance with a moving speed of the receiving apparatus. In this event, the receiving apparatus measures the moving speed thereof. When the moving speed is slow, the frequency of the measurement is decreased because there is less possibility where a reception condition changes. Conversely, when the moving speed is fast, the frequency of the measurement is increased because there is more possibility where the reception condition changes.

When a difference between the strength of the received electric field for the first reception antenna 21 and the strength of the received electric field for the second reception antenna 22 is greater than a predetermined value, a measurement time interval or the number of measured time slots may be decreased.

According to the receiving apparatus as described above, following merits are obtained. Firstly, in the conventional CDMA receiving apparatus (FIG. 1) comprising the first and the second CDMA receiving parts 41 and 42, it is necessary to implement the receiving portion, the A/D converting portion, and the despreading portion each CDMA receiving part and the portable telephone set or the like has a large size as a whole. In addition, inasmuch as the conventional COMA receiving apparatus comprises two CDMA receiving parts, it is disadvantageous in that it has a twice consumption current in comparison with a case where the receiving apparatus comprises only one receiving part. On the contrary, the CDMA receiving apparatus (FIG. 4) according to this invention comprises only one CDMA receiving part 41. Accordingly, it is possible to resolve the above-mentioned disadvantage.

Secondary, the CDMA receiving apparatus according to this invention comprises the antenna switching circuit 62 which is composed of small parts and which has a small mounted space as illustrated in FIG. 5. Accordingly, it is possible to realize an antenna diversity reception with structure near to the switching relay 53 for switching the first reception antenna 21 and the second reception antenna 22 in the TDMA receiving apparatus illustrated in FIG. 2. Specifically, the CDMA receiving apparatus according to this invention is easily adopted to a mobile communication apparatus.

Thirdly, in the CDMA reception carrying out continuous reception, the CDMA receiving apparatus according to this invention continuously changes attenuating amounts for an input electric field from antenna and accumulates received electric fields in the first and the second reception antennas 21 and 22. Accordingly, an error does not occur in the received data on switching the reception antennas 21 and 22.

Fourthly, the first and the second reception antennas 21 and 22 and the CDMA receiving part 41 are connected via the T-type attenuator using three pin diodes 81 to 83 and it is therefore realize a circuit having a constant impedance of about 50 ohms. As a result, the CDMA receiving apparatus according to this invention is advantageous in that mutual impedance interference between the first and the second reception antennas 21 and 22 is small. Accordingly, disturbance of antenna impedance is small if determination of antenna switching is carried out and it is possible to satisfactorily connect the antennas.

Fifthly, it is possible to realize a stable antenna impedance because the voltage control holding circuit 76 can adjust the antenna impedance in consideration of peculiar characteristic of circuit elements for each receiving apparatus.

While this invention has thus far been described in conjunction with a few embodiments thereof, it will readily be possible for those skilled in the art to put this invention into practice in various other manners.

What is claimed is:

1. A Code Division Multi Access (CDMA) digital reception apparatus comprising:

first and second reception antennas;

reception level control means, connected to said first and said second reception antennas, for gradually increasing one of reception levels in said first and said second reception antennas during a predetermined time interval and for gradually decreasing another of the reception levels during the predetermined time interval;

measuring means for measuring strength of a received electric field from said first and second reception antennas during the predetermined time interval and adding said measured strength of said received electric field from said first reception antenna to produce a first accumulated amount and adding said measured strength of said received electric field from said second reception antenna to produce a second accumulated amount; and selecting means for selecting, in response to said first and second accumulated amounts one of said first and said second reception antennas.

2. A Code Division Multi Access (CDMA) digital reception apparatus as claimed in claim 1, wherein said reception level control means comprises:

first attenuating means for attenuating the reception level in said first reception antenna; and second attenuating means for attenuating the reception level in said second reception antenna;

said reception level control means gradually decreasing an attenuating amount in said first attenuating means and gradually increasing an attenuating amount in said second attenuating means.

3. A Code Division Multi Access (CDMA) digital reception apparatus as claimed in claim 2, wherein said first and said second attenuating means are composed of a T-type attenuator including first through third variable attenuating elements having first through third attenuating amounts which vary in accordance with first through third control voltages supplied thereto.

4. A Code Division Multi Access (CDMA) digital reception apparatus as claimed in claim 3, wherein said first through third variable attenuating elements comprise first through third pin diodes having anode electrodes supplied with said first through third control voltages.

5. A Code Division Multi Access (CDMA) digital reception apparatus as claimed in claim 3, wherein further comprises:

first through third memories for storing data corresponding to said first through third control voltages; and first through third digital-to-analog converting sections for converting data read from said first through third memories into first through third analog signals, respectively, said first through third analog signals being supplied to said first through third variable attenuating elements as said first through third control voltages, respectively.

6. A Code Division Multi Access (CDMA) digital reception apparatus as claimed in claim 5, wherein said first through third variable attenuating elements comprise first through third pin diodes having anode electrodes supplied with said first through third control voltages.

7. A Code Division Multi Access (CDMA) digital reception apparatus as claimed in claim 1, wherein said measuring means measures the first accumulated amount of the strength of the received electric field in a first half of a first plurality of time slots within a first predetermined time interval and the second accumulated amount of the strength of the received electric field in a latter half of a second plurality of time slots within a second predetermined time interval, said selecting means selecting one of said first and said second reception antennas in accordance with a comparison result between said first and said second accumulated amounts.

8. A Code Division Multi Access (CDMA) digital reception apparatus as claimed in claim 7, wherein said measuring means decreases a frequency of measurement when a current comparison result is identical with to a previous comparison result.

9. A Code Division Multi Access (CDMA) digital reception apparatus as claimed in claim 7, wherein said measuring means shortens the predetermined time interval when a difference between said first and said second accumulated values is larger than a predetermined value.

10. A Code Division Multi Access (CDMA) digital reception apparatus as claimed in claim 1, wherein said measuring means decreases a frequency of measurement when said digital multiple reception apparatus is put into a reception wait state.

11. A Code Division Multi Access (CDMA) digital reception apparatus as claimed in claim 1, wherein said measuring means decreases a frequency of measurement when said digital multiple reception apparatus is located outside an area where an electric wave to be received reaches.

12. A Code Division Multi Access (CDMA) digital reception as claimed in claim 1, wherein said measuring means increases and decreases a frequency of measurement in accordance with a moving speed of said digital multiple reception apparatus.

13. A Code Division Multi Access (CDMA) digital reception apparatus as claimed in claim 1, wherein said measuring means decreases a frequency of measurement when a battery serving as a power supply of said digital multiple reception apparatus has a power remaining amount which is not more than a predetermined value.

14. A Code Division Multi Access (CDMA) digital reception as claimed in claim 1, wherein said measuring means increases and decreases a frequency of measurement in accordance with a value of strength of a received electric field.

15. A method of receiving in a Code Division Multi Access (CDMA) digital reception apparatus comprising first and second reception antennas, said method comprising:

a reception level control step of gradually increasing one of reception levels in said first and said second reception antennas during a predetermined time interval and of gradually decreasing another of the reception levels during the predetermined time interval;

a measuring step of measuring strength of a received electric field from said first and second reception antennas during the predetermined time interval the predetermined time interval to produce first and second measured strength value;

a calculating step of adding said a first measured strength value from said first reception antenna to produce a first accumulated amount during a first predetermined time interval and adding said second measured strength value from the second reception antenna during the predetermined time interval to produce a second accumulated amount; and a selecting step of selecting, in response to said first and second accumulated amounts, one of said first and said second reception antennas.

16. A method as claimed in claim 15, wherein said reception level control step uses first and second attenuators for attenuating the reception levels in said first and said second reception antennas to gradually decrease a first attenuating amount in said first attenuator and to gradually increase a second attenuating amount in said second attenuator.

17. A method as claimed in claim 15, wherein said calculating step calculates said first accumulated amount of the strength of the received electric field in a first half of a first plurality of time slots within a first predetermined time interval and said second accumulated amount of the strength of the received electric field in a latter half second plurality of time slots within a second predetermined time interval.

18. A method as claimed in claim 17, wherein said measuring step decreases a frequency of measurement when a current comparison result is identical with to a previous comparison result.

19. A method as claimed in claim 17, wherein said measuring step shortens the predetermined time interval when a difference between said first and said second accumulated values is larger than a predetermined value.

20. A method as claimed in claim 15, wherein said measuring step decreases a frequency of measurement when said digital multiple reception apparatus is put into a reception wait state.

21. A method as claimed in claim 15, wherein said measuring step decreases a frequency of measurement when said digital multiple reception apparatus is located outside an area where an electric wave to be received reaches.

22. A method as claimed in claim 15, wherein said measuring step increases and decreases a frequency of measurement in accordance with a moving speed of said digital multiple reception apparatus.

23. A method as claimed in claim 15, wherein said measuring step decreases a frequency of measurement when a battery serving as a power supply of said digital multiple reception apparatus has a power remaining amount which is not more than a predetermined value.

24. A method as claimed in claim 15, wherein said measuring step increases and decreases a frequency of measurement in accordance with a value of strength of a received electric field.

* * * * *